US005754874A

United States Patent [19]

Watanabe et al.

[11] Patent Number: 5,754,874

[45] Date of Patent: May 19, 1998

[54] DIGITAL SIGNAL PROCESSOR WITH SELECTIVE SOUND OPERATION

[75] Inventors: Kazuo Watanabe, Koufu; Makio Yamaki, Tokyo, both of Japan

[73] Assignees: Pioneer Video Corporation, Yamanashi; Pioneer Electronic Corporation, Tokyo, both of Japan

[21] Appl. No.: 322,353

[22] Filed: Oct. 13, 1994

Related U.S. Application Data

[63] Continuation of Ser. No. 993,011, Dec. 18, 1992, abandoned.

[30] Foreign Application Priority Data

Dec. 18, 1991 [JP] Japan .................................. 3-335261

[51] Int. Cl.[6] .................................................. G06F 13/00

[52] U.S. Cl. .............. 395/800.01; 395/835; 395/800.43; 395/570; 364/180; 364/232.93; 364/271.9; 364/DIG. 1

[58] Field of Search .................................. 395/800, 200, 395/250, 800.01, 835, 800.43, 570; 364/DIG. 1, 232.93, 240.06, 271.05, 180, 271.9; 381/63, 103, 31, 61

[56] References Cited

U.S. PATENT DOCUMENTS

| | | | |
|---|---|---|---|
| 4,092,495 | 5/1978 | Underwood et al. | 395/2.67 |
| 4,181,963 | 1/1980 | Yanagawa | 364/705.07 |
| 4,201,105 | 5/1980 | Alles | 84/606 |
| 4,546,690 | 10/1985 | Tanaka et al. | 84/477 R |
| 5,091,947 | 2/1992 | Ariyoshi et al. | 395/2.55 |
| 5,091,951 | 2/1992 | Ida et al. | 381/63 |
| 5,111,409 | 5/1992 | Gasper et al. | 395/152 |
| 5,146,507 | 9/1992 | Satoh et al. | 381/103 |
| 5,210,806 | 5/1993 | Kihara et al. | 381/103 |
| 5,218,710 | 6/1993 | Yamaki et al. | 395/800 |
| 5,239,470 | 8/1993 | Komatsu | 364/424.04 |
| 5,434,923 | 7/1995 | Honda | 381/63 |

OTHER PUBLICATIONS

Kiuchi et al, "The Digital Signal Processor LSI for Car Acoustic Environment Reproduction", IEEE 1988, pp. 6–12.

Higurashi et al., "Digital Sound System of S-VHS VCR", IEEE Jun. 1990, pp. 642–646.

*Primary Examiner*—Alyssa H. Bowler
*Assistant Examiner*—Dzung C. Nguyen
*Attorney, Agent, or Firm*—Fish & Richardson P.C.

[57] ABSTRACT

A digital signal processor (DSP) comprises a condition flag register directly accessible by the control microcomputer. Referring to a condition flag of the condition flag register every sampling period of the DSP, the DSP can change the content of a process every sampling period in accordance with the set status of the condition flag. The DSP sets the condition flag in the condition flag register at the beginning of a sampling period of the DSP by a set instruction, and resets the condition flag at the end of a sampling period by a reset instruction. The DSP may be modified to automatically reset the condition flag at the end of the sampling period in which the condition flag has been set.

4 Claims, 5 Drawing Sheets

DIGITAL SIGNAL PROCESSOR WITH SELECTIVE SOUND OPERATION

This application is a continuation of U.S. application Ser. No. 07/993,011 filed Dec. 18, 1992, now abandoned.

BACKGROUND OF THE INVENTION

1. Field of the Invention

The present invention relates to a digital signal processor (hereinafter referred to as "DSP").

2. Description of the Related Art

There are audio signal processing units which control the sound field of reproduced sounds to create in a room or a vehicle the same sound space (e.g., reverberation and presence) as in concert halls or theaters (see Japanese Pat. Application Provisional Publication No. 64-72615). This type of an audio signal processing unit is equipped with a DSP that performs digital processing on audio signals, supplied from an audio signal source, such as a tuner, to provide the desired sound field control.

The DSP normally comprises an operation section, which performs operations, such as arithmetic operations, and some memories including a data RAM for storing digital audio signal data that is to be sent to the operation section and a coefficient RAM for storing coefficient data by which the audio signal data is multiplied. The DSP is so designed to exchange signal data between those memories and send the signal data from the individual memories to the operation section to repeatedly perform predetermined operations on them at a high speed, in accordance with a given program.

An operation program is written in a programmable program RAM in the DSP. Every time the sound field mode is switched, the program is replaced with a new program, which is transferred from an external control microcomputer to that program RAM, thus providing the desired sound space. The DSP responds to a command from the microcomputer every time it enters or jumps to a new process by an interrupt while performing one process, changes coefficient data, resets a process and so forth.

To monitor and control the overall processing of the DSP using the control microcomputer, a command should be sent to the DSP from the microcomputer every time the processing is to be altered. The conventional DSP therefore involves problems of complex processing.

OBJECT AND SUMMARY OF THE INVENTION

It is therefore an object of the present invention to provide a DSP which is designed to reduce the intervention of a control microcomputer to the DSP as much as possible to make the processing algorithm between the DSP and microcomputer simpler.

To achieve this object, according to the present invention, there is provided a DSP capable of rewriting a program or data necessary for an operation, transferred from a control microcomputer, the DSP comprising a condition flag register directly accessible by the control microcomputer, whereby referring to a condition flag of the condition flag register every sampling period of the DSP, the DSP can change the content of a process every sampling period in accordance with the set status of the condition flag.

According to another aspect of the invention, the DSP is designed to set the condition flag in the condition flag register at the beginning of a sampling period of the DSP when receiving an instruction to set the condition flag from the microcomputer, and reset the condition flag at the end of a sampling period when receiving a reset instruction therefrom.

According to a further aspect of the invention, the DSP is also designed to set the condition flag in the condition flag register at the beginning of a sampling period of the DSP when receiving an instruction to set the condition flag from the microcomputer, and automatically reset the condition flag at the end of the sampling period.

With the above structure, the condition flag is set in the condition flag register in the DSP directly by the microcomputer. The DSP refers to this condition flag every sampling period, and, if the condition flag is set, enters or jumps to a predetermined process. It is therefore possible to change the processing of the DSP in any sampling period by controlling the condition flag.

Since the condition flag is set or reset in synchronism with the beginning or end of one sampling period of the DSP, the condition flag will not be changed in the middle of any sampling period. Thus, the content of a process will not be changed at the beginning and end of one sampling period of the DSP.

Further, the DSP may be designed to set the flag at the beginning of one sampling period and automatically reset this flag at the end of that sampling period. This design can ensure simple and sure process alteration that is complete in one sampling period.

DETAILED DESCRIPTION OF THE PREFERRED EMBODIMENT

A preferred embodiment of the present invention will now be described referring to the accompanying drawings.

Figure 1:
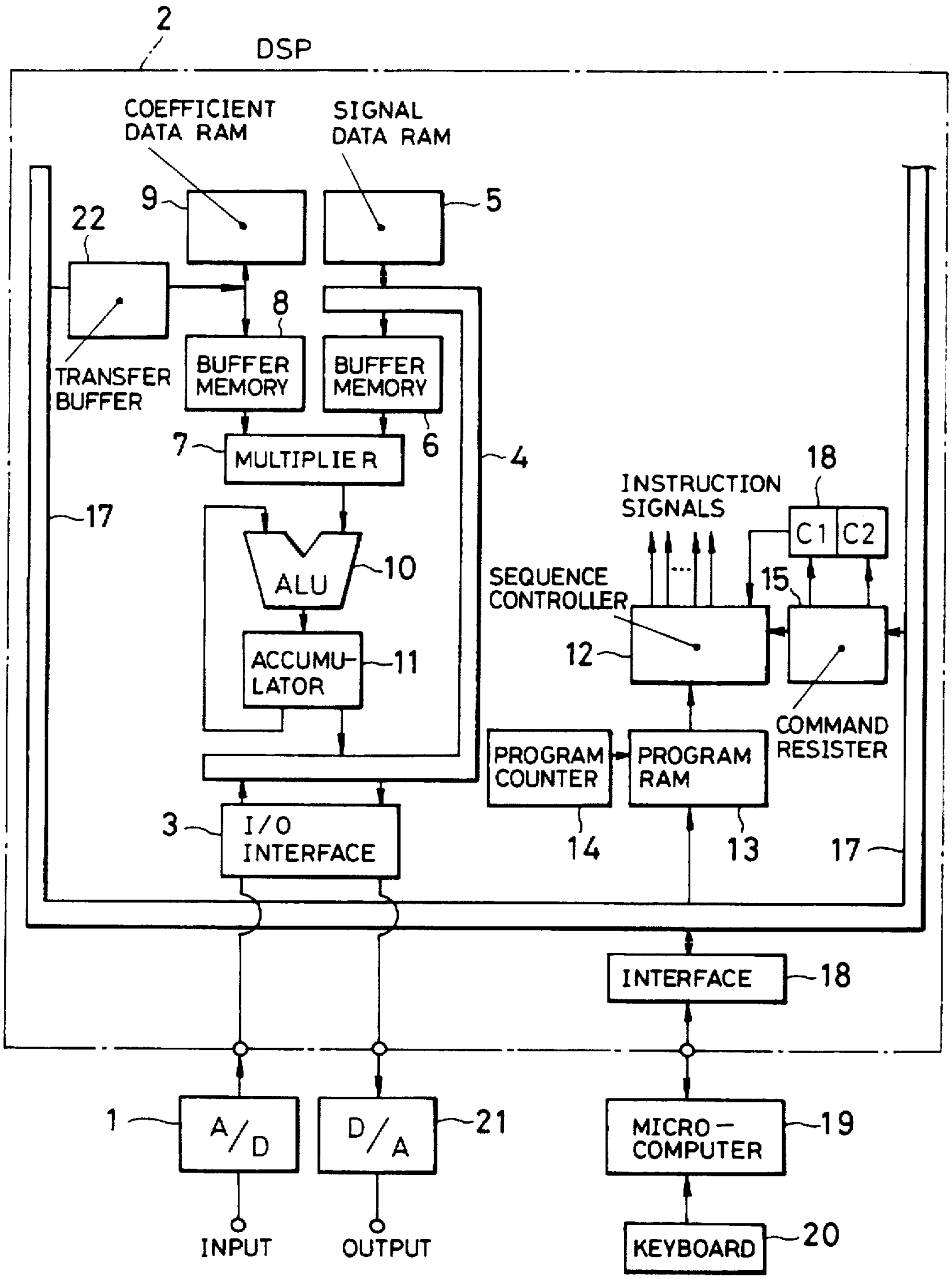
FIG. 1 is a block diagram illustrating a digital signal processor according to one embodiment of the present invention.

FIG. 1 illustrates a DSP according to one embodiment of the present invention. Referring to FIG. 1, an analog audio signal is sent via an A/D converter 1 to an input/output (I/O) interface 3 in a DSP 2. The I/O interface 3 is connected to a data bus 4 to which a signal data RAM 5 for storing audio signal data is connected.

Also connected to the data bus 4 is a buffer memory 6 whose output is connected to one input of a multiplier 7. Another buffer memory 8 for holding coefficient data is connected to the other input of the multiplier 7. This buffer memory 8 is connected to a coefficient data RAM 9 that stores coefficient data.

An ALU (Arithmetic and Logic Unit) 10 performs operations such as the accumulation of the computed outputs of the multiplier 7. The ALU 10 has two inputs: one input supplied with the output of the multiplier 7 and the other supplied with the output of an accumulator 11 which holds the computed output of the ALU 10. The output of the accumulator 11 is sent on the data bus 4.

Interface 3, signal data RAM 5, buffer memories 6 and 8, multiplier 7, coefficient data RAM 9, ALU 10 and accumulator 11 operate under the control of a sequence controller 12. A program RAM 13 is connected to the sequence controller 12 so that the controller 12 gives a predetermined instruction signal to a certain circuit at a given timing in accordance with a program written in that RAM 13.

Every time the count value in a program counter 14 is incremented, the program RAM 13 reads an instruction code from the address corresponding to this new count value, and gives it to the sequence controller 12. The sequence controller 12 is also connected with a command register 15 that holds a command from a control microcomputer 19, which will be described later.

The command register 15 is connected with a condition flag register 16, a means featuring the DSP of this invention. This condition flag register 16 is provided with two condition flags C1 and C2 the status of which can be designated by the control microcomputer 19.

The condition flag C1 is set and reset under the control of the microcomputer 19, while the condition flag C2 is set under the control of the microcomputer 19 but is reset automatically at the end of the sampling period in which it has been set. Incidentally, the sequence controller 12 refers to the flag contents of the condition flag register 16 every sampling period.

The program RAM 13 and command register 15 are connected to a main bus 17. The aforementioned control microcomputer 19 is connected via an interface 18 to the main bus 17. The microcomputer 19 comprises a microprocessor, a RAM and a ROM (none shown). In the ROM of the microcomputer 19 are previously stored operation programs that are used by the DSP and pieces of coefficient data necessary in the individual operation programs as well as the control program that the microcomputer itself uses.

A keyboard 20 is connected to the microcomputer 19. The keyboard 20 has various sound field control keys for hall 1, hall 2, pro-logic playback, 3-channel playback and so forth. The microcomputer 19 fetches an operation program associated with the operated key and coefficient data that is used in that program from the ROM, and sends them to the DSP 2 via the interface 18. After being processed in the DSP 2, the audio signal data is supplied via the data bus 4 and I/O interface 3 to a D/A converter 21 to be converted into an analog signal.

The operation of this embodiment with the above structure will be described below. To begin with, the general operation of the DSP will be explained.

When any key on the keyboard 20 is operated, the microcomputer 19 reads out the operation program associated with that key from the ROM (not shown), and stores it into the program RAM 13 via the interface 18 and main bus 17. At the same time, the microcomputer 19 reads out coefficient data $\alpha_1, \alpha_2, \ldots \alpha_n$ which are to be used in that program, and transfers the data to the coefficient data RAM 9 via the interface 18, main bus 17 and a transfer buffer 22 to be stored in the coefficient data RAM 9.

When the operation program and co efficient data are set in the DSP 2, a predetermined operation on an input audio signal starts. More specifically, the audio signal coming from the A/D converter 1 is sequentially sampled at given sampling periods, yielding audio signal data $d_1, d_2, \ldots, d_n$. Those audio signal data $d_1, d_2, \ldots, d_n$ are sent via the I/O interface 3 onto the data bus 4 to be written in the signal data RAM 5.

The first signal data d, is read out first from the signal data RAM 5 and held in the buffer memory 6. Meanwhile, the first coefficient data $\alpha_1$ is read out from the coefficient data RAM 9 and held in the buffer memory 8. The multiplier 7 multiplies $d_1$ by $\alpha_1$, and sends out the result $\alpha_1 \cdot d_1$ to the ALU 10. The ALU 10 adds the initial value "0" of the accumulator 11 to the multiplication result $\alpha_1 \cdot d_1$, and sets the result $\alpha_1 \cdot d_1$ again into the accumulator 11.

Then, the second signal data $d_2$ is held in the buffer memory 6, and the second coefficient data $\alpha_2$ in the buffer memory 8. The data $d_2$ is multiplied by $\alpha_2$ in the multiplier 7, and the value $\alpha_1 \cdot d_1$, held in the accumulator 11, is added to the resultant value $\alpha_2 \cdot d_2$ in the ALU 10. The resultant value $\alpha_1 \cdot d_1 + \alpha_2 \cdot d_2$ are set again in the accumulator 11. Such product and sum operations ($\Sigma \alpha_i d_i$) are repeated at a high speed to perform a predetermined operation on the input audio signal.

The audio signal data acquired by the product and sum operations is temporarily stored in the signal data RAM 5 via the accumulator 11 and data bus 4. The audio signal data is then transferred via the data bus 4 to the I/O interface 3 from the signal data RAM 5 at a given timing to be converted into an analog signal.

Referring now to the timing chart shown in FIG. 2, a description will now be given regarding how the condition flag C1 of the condition flag register 16, the feature of the present invention, is set and reset. As mentioned earlier, the setting and resetting of the condition flag C1 are both controlled by the microcomputer 19.

Figure 2:
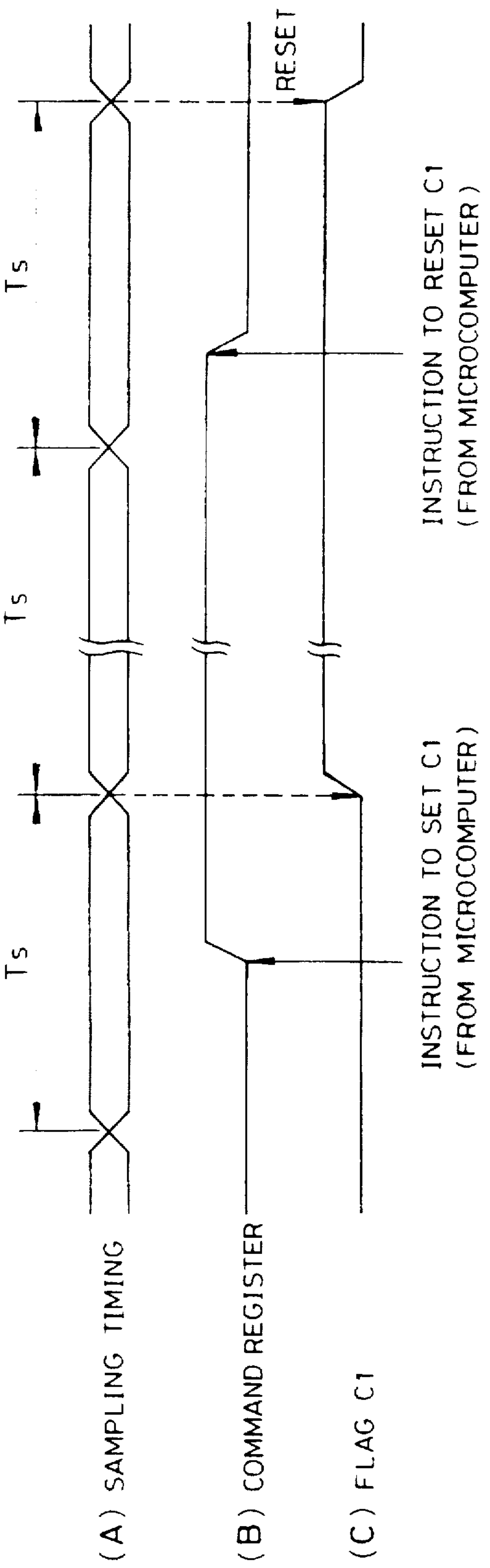
FIG. 2 is a timing chart showing the timings at which a condition on flag C1 is set and reset.

When a command to change the sound field mode is issued from the keyboard 20, the microcomputer 19 sends an instruction to set the condition flag C1 to the command register 15 via the interface 18 and main bus 17, and temporarily stores this set instruction into a buffer (not shown) in the command register 15 as shown in (B) in FIG. 2. The temporary storage of the flag-set instruction is executed immediately upon the issuance of the set instruction from the microcomputer 19 in asynchronism with a sampling period $T_s$ ((A) in FIG. 2) which is a processing unit.

After the temporary storage of the set instruction for the condition flag C1 in the command register 15, the condition flag C1 in the condition flag register 16 is set to "1" at the beginning of the next sampling period $T_s$ as indicated by (C) in FIG. 2. If the set instruction for the condition flag C1 is sent in asynchronism with the sampling period $T_s$ of the DSP 2, therefore, the condition flag C1 is always set at the beginning of the sampling period $T_s$ in synchronism with that period $T_s$.

Meanwhile, an instruction to refer to the condition flag C1 every sampling period Ts (processing unit of the DSP 2) is inserted in advance in the operation program that is stored in the program RAM 13. Accordingly, the sequence controller 12 refers to the condition flag C1 in the condition flag register 16 every sampling period $T_s$. If the condition flag C1 is set to "1", the sequence controller 12 jumps from the currently executing routine to a different routine and starts executing the new routine.

When a mode release command is issued from the keyboard 20, the microcomputer 19 sends an instruction to reset the condition flag C1 to the command register 15 via the interface 18 and main bus 17, and temporarily stores this reset instruction into the buffer (not shown) in the command register 15 as shown in (B) in FIG. 2. As in the case of the set instruction, the temporary storage of the reset instruction is executed immediately upon the issuance of the reset instruction from the microcomputer 19 in asynchronism with the sampling period $T_s$ ((A) in FIG. 2).

After the temporary storage of the reset instruction for the condition flag C1 in the command register 15, the condition flag C1 in the condition flag register 16 is reset to "0" at the end of the next sampling period $T_s$ according to the reset instruction stored in the command register 15 as indicated by (C) in FIG. 2. If the reset instruction for the condition flag C1 is sent in asynchronism with the sampling period $T_s$ of the DSP 2, therefore, the condition flag C1 is always reset at the end of the sampling period $T_s$ in synchronism with that period $T_s$.

The sequence controller 12 refers to the condition flag C1 in the condition flag register 16 every sampling period $T_s$ (processing unit). If the condition flag C1 is reset to "0", the sequence controller 12 returns from the currently executing routine to the original routine.

Figure 3:
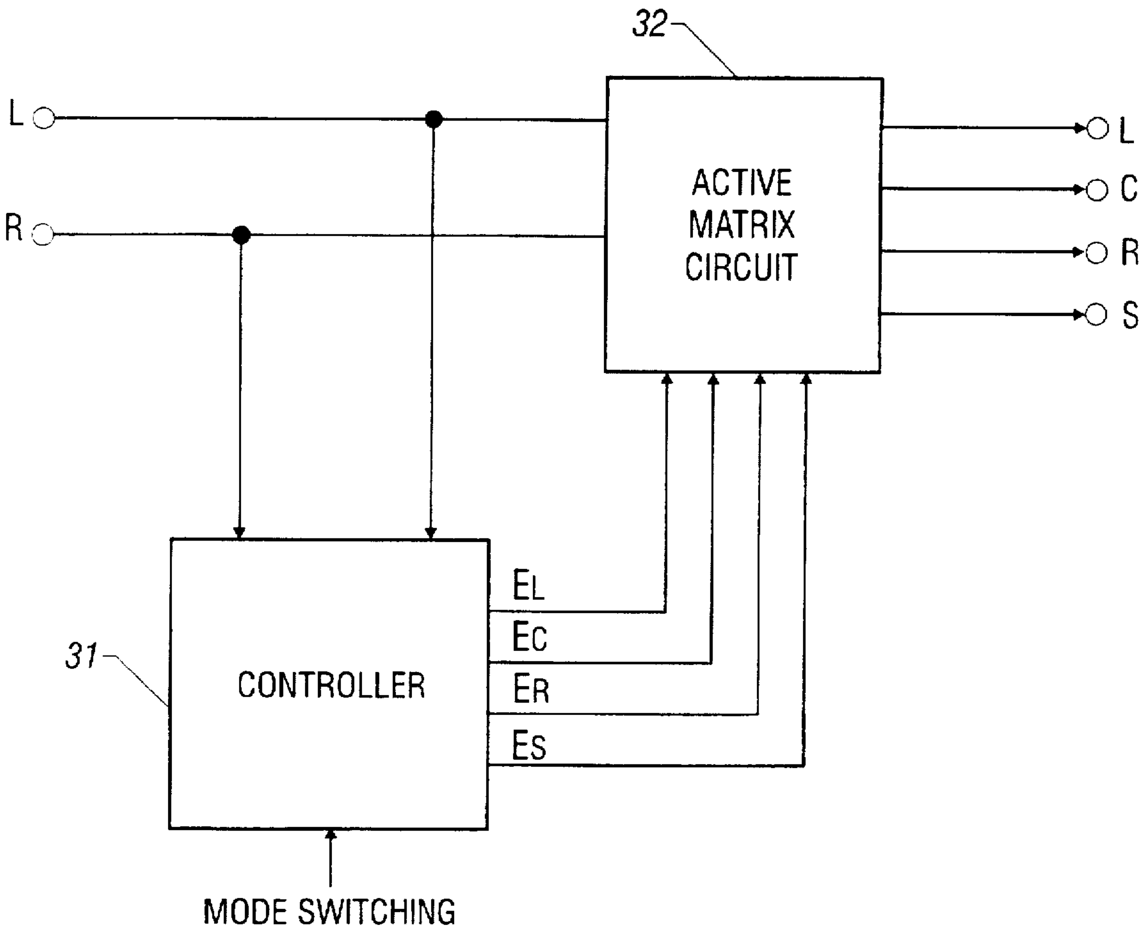
FIG. 3 is a diagram showing an example of a sound field control circuit that uses the condition flag C1.

The switching between the pro-logic playback and 3-channel playback in a sound field control circuit as shown in FIG. 3 is a specific example of the processing that involves the condition flag C1.

The pro-logic playback is to produce a center signal C and a surround signal S from right and left stereo signals R and L in an active matrix circuit 32 under the control of a controller 31 to drive the individual loudspeakers using those signals. The 3-channel playback is to activate the individual loudspeakers using the right and left stereo signals R and L and the center signal C. The DSP shown in FIG. 1 accomplishes a software-based sound field control circuit of such kind according to the operation program transferred to and stored in the program RAM 13.

When one wants to switch the mode to the 3-channel playback while performing the pro-logic playback in the sound field control circuit in FIG. 3, the switching requires not only the cutoff of the surround signal S but also fixing a surround control signal $E_S$ from the controller 31 to, for example, 0. This is because the other output signals L, C and R are influenced by the surround control signal $E_S$. Conventionally, at the same time the mode is switched, an operation program for the 3-channel playback is transferred to the program RAM 13 from the microcomputer 19 to start the 3-channel playback.

According to the present invention, programs for the pro-logic playback and 3-channel playback are incorporated in advance into the operation program which implements the sound field control circuit shown in FIG. 3, the condition flag C1 of "0" is assigned to the prologic playback mode and the condition flag C1 of "1" to the 3-channel playback mode, and an instruction to refer to the condition flag C1 every sampling period $T_s$ is written in the operation program. This design allows for easy switching between the pro-logic playback process and 3-channel playback process simply by the control of the microcomputer 19 for switching between the set and reset of the condition flag C1 in the DSP 2.

In switching between the pro-logic playback and 3-channel playback, two processes, the cutoff of the surround signal S and the fixing of the surround signal $E_S$ to 0, should be simultaneously performed in one sampling period. When the condition flag C1 is set or reset in a middle of one sampling period, therefore, only one of the two processes may be executed in one sampling period. According to the present invention, however, the condition flag C1 is always set and reset respectively at the beginning and end of a sampling period Ts in synchronism with that period, eliminating the possibility that only one of the two processes is executed in one sampling period.

Referring now to a timing chart shown in FIG. 4, how the condition flag C2 in the condition flag register 16 is set and reset will be explained. As mentioned earlier, this condition flag C2 is set under the control of the microcomputer 19 but is reset automatically at the end of the sampling period in which the flag C2 has been set.

Figure 4:
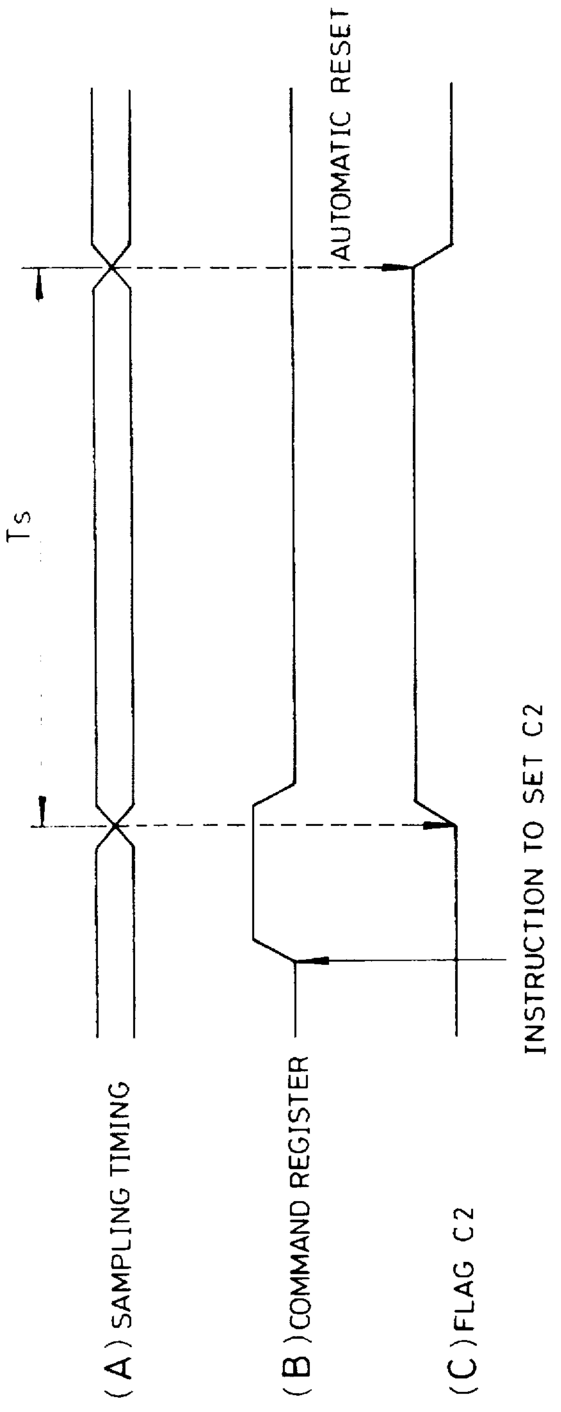
FIG. 4 is a timing chart showing the timings at which a condition flag C2 is set and reset.

When an instruction to set the condition flag C2 is issued from the microcomputer 19, the DSP 2 sets the condition flag C2 to "1" at the beginning of the sampling period Ts, as in the case of the condition flag C1 (see FIG. 4). After setting the condition flag C2 to "1", the DSP 2 automatically resets the condition flag C2 at the end of the same sampling period Ts. Therefore, the condition flag C2, unlike the condition flag C1, is set to "1" only in one sampling period Ts and reset at the end thereof.

Figure 5:
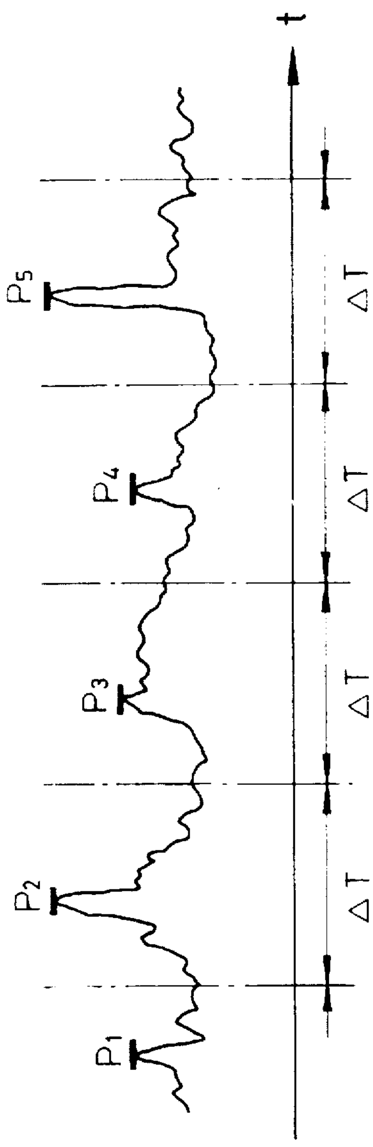
FIG. 5 is a diagram showing an example of a peak display process that uses the condition flag C2.

Specific examples of the utilization of the condition flag C2 include a peak display process which computes and displays a peak Pi (i=1, 2, 3, . . . ) every level detecting period ΔT, as shown in FIG. 5, and a process of supplying an impulse to start oscillation in a digital oscillator. The application for the peak display process will be described referring to FIG. 5. The DSP 2 executes a peak calculation program with a group of sampled data of an audio signal included in a given level detecting period ΔT, which consists of multiple sampling periods, to acquire a peak Pi in that level detecting period. The DSP 2 repeatedly runs the same peak calculation program for the subsequent level detecting periods ΔT.

In this peak display process, when each level detecting period ΔT starts, the result of the peak calculation for the previous period ΔT should be temporarily reset. The present invention can accomplish this easily using the condition flag C2. To describe in detail, the microcomputer 19 is programmed to issue an instruction to set the condition flag C2 in the last sampling period $T_s$ in the previous level detecting period ΔT, so that the condition flag C2 in the condition flag register 16 is set in the first sampling period $T_s$ in the next level detecting period ΔT.

Referring to the set status of the condition flag C2, the DSP can reset the result of the level calculation in the previous level detecting period, in the first sampling period Ts in the next level detecting period ΔT, and control to automatically restart the peak calculation program from the beginning of that level detecting period.

As described above, the DSP of the present invention comprises a condition flag register directly accessible by the control microcomputer, whereby referring to a condition flag of the condition flag register every sampling period of the DSP, the DSP can change the content of a process every sampling period in accordance with the set status of the condition flag. The processing of the DSP can be changed every sampling period by controlling the condition flag by the microcomputer, so that the intervention of a control microcomputer to the DSP can be reduced as much as possible to make the processing algorithm between the DSP and microcomputer simpler.

The DSP is designed to set the condition flag in the condition flag register at the beginning of a sampling period of the DSP when receiving an instruction to set the condition flag from the microcomputer, and reset the condition flag at the end of a sampling period when receiving a reset instruction therefrom. This prevents the condition flag from being changed in a middle of one sampling period, so that the content of the process of the DSP will not be altered during one sampling period.

The DSP is also designed to set the condition flag in the condition flag register at the beginning of a sampling period of the DSP when receiving an instruction to set the condition flag from the microcomputer, and automatically reset the condition flag at the end of the sampling period. This design permits easy and sure execution of process alteration that is complete in one sampling period.

What is claimed is:

1. A digital signal processing assembly that uses a control microcomputer to specify and control an operation to be carried out on incoming sound, comprising:

arithmetic operation means for performing a sound operation process on an incoming audio signal, said arithmetic means having:

a program memory, connected to said control microcomputer and storing a processing program and data for said sound operation process specified by said control microcomputer, said processing program and data providing, when executed, a plurality of sound processing modes, an instruction register which stores instructions including a flag-set instruction to set a condition flag which is received at an arbitrary timing, a condition flag register, connected to said instruction register and under control of said control microcomputer, includes the condition flag which is set and reset by said control microcomputer by using said flag-set instruction stored in said instruction register, said setting and resetting of said condition flag being performed at a start time of one sampling period, and a sequence controller operating to control an arithmetic operation carried out by said arithmetic operation means every sampling period of said digital signal processing assembly, wherein said sequence controller is responsive to a state of said condition flag of said condition flag register during every sampling period of said digital signal processing assembly, and controls switching of the sound processing mode of said sound operation process, said control being performed by said arithmetic operation means at an end of one sampling period in accordance with a status of said condition flag.

2. The digital signal processing assembly according to claim 1, wherein said plurality of sound processing modes of said processing program are processing modes for producing different sound fields.

3. The digital signal processing assembly according to claim 1, wherein said control microcomputer has a user operating part, and wherein set and reset of said condition flag is controlled by said control microcomputer in response to a user operation through said user operating part.

4. A digital signal processing assembly comprising:

a control microcomputer, operating to specify and control an operation to be carried on incoming sound, and setting and resetting the control flag based on incoming factors;

an arithmetic operation unit, physically and electrically separated from said control microcomputer, and operating to perform a sound operation process on the incoming sound based on commands from the control microprocessor, said arithmetic operation unit having:

a program memory, connected to receive and store a processing program and data for said sound operation process specified by said control microcomputer, said processing program and data providing, when executed, a plurality of sound processing modes;

an instruction register which stores instructions including a flag-set instruction to set a condition flag which is received at an arbitrary timing;

a condition flag-register, connected to said instruction register and under control of said control microcomputer and including the condition flag which is set and reset by said control microcomputer by using said flag-set instruction stored in said instruction register, said setting and resetting of said condition flag being performed at a start time of one sampling period; and a sequence controller operating to control an arithmetic operation to be carried by said arithmetic operation unit during every sampling period of said digital signal processing assembly, wherein said sequence controller is responsive to a state of said condition flag of said condition flag register registered during every sampling period of said digital signal processing assembly, and control switching of the sound processing mode of said sound operation process, said control being performed by said arithmetic operation unit at an end of one sampling period in accordance with a status of said condition flag.

* * * * *